United States Patent [19]

Chen

[11] Patent Number: 5,199,283
[45] Date of Patent: Apr. 6, 1993

[54] AUTOMOBILE STEERING LOCK

[76] Inventor: Hsien-Paue Chen, No. 76, Lane 274, Jung-Jeng S. Road, Yung-Kang Shiang, Tainan Hsien, Taiwan

[21] Appl. No.: 882,038

[22] Filed: May 13, 1992

[51] Int. Cl.$^5$ .............................................. B60R 25/02
[52] U.S. Cl. ........................................ 70/209; 70/226
[58] Field of Search ................. 70/209, 211, 212, 225, 70/226, 237, 238

[56] References Cited

U.S. PATENT DOCUMENTS

| | | | |
|---|---|---|---|
| 4,747,279 | 5/1988 | Solow | 70/238 |
| 4,825,671 | 5/1989 | Wu | 70/238 |
| 4,949,561 | 8/1990 | Solow et al. | 70/209 |
| 5,005,388 | 4/1991 | Lo | 70/209 |
| 5,069,048 | 12/1991 | Lo | 70/209 |
| 5,095,723 | 3/1992 | Lin | 70/209 |
| 5,107,691 | 4/1992 | Wu | 70/226 X |

FOREIGN PATENT DOCUMENTS

| | | | |
|---|---|---|---|
| 1467816 | 3/1977 | United Kingdom | 70/238 |
| 2238519 | 6/1991 | United Kingdom | 70/238 |

Primary Examiner—Lloyd A. Gall
Attorney, Agent, or Firm—Bacon & Thomas

[57] ABSTRACT

An anti-theft device for attachment to a steering wheel of an automobile comprising a tubular body member having a passageway extending axially therethrough, a first hook secured to the body member, a hexagonal rod member adapted to move telescopically in the passageway in the body member and connected with an elongate connecting member, a second hook secured to the connecting member to hook an inside portion of a steering wheel diametrically opposed to the first hook, a housing fixed with an inner end of the body member, a lock and a locater are lodged in the housing to lock the rod member with respect to the body member at any of a plurality of positions.

3 Claims, 8 Drawing Sheets

AUTOMOBILE STEERING LOCK

BACKGROUND OF THE INVENTION

A conventional anti-theft device for attachment to a steering wheel of an automobile shown in FIGS. 1 and 2 comprises a body member 10, a steel ball 11, a biasing spring 12, a cap 13, a locking means 14, a rod member 15 having a plurality of annular grooves 151 and two U-shaped hooks 150 for hooking on opposite portions of a steering wheel. The rod member 15 is locked at any of a plurality of positions by the steel ball 11 fitting in one of the grooves 151. When this lock is to be unlocked or locked, the locking means 14 has to be rotated by a correct key, causing the ball 11 to separate from or engage in one of the grooves 151. But the hook 150 is liable to be forcefully bent outward with tools and de-hooked from a steering wheel to permit the car to be stolen by a thief. In addition, the rod member and the body member are too long, and inconvenient for handling and storing.

SUMMARY OF THE INVENTION

This invention has been devised to offer an improved anti-theft device for attachment to a steering wheel of an automobile, having the following advantages.

1. Higher anti-theft effectiveness by securely engaging a steering wheel.
2. More convenient collapsibility for storage.
3. More simplicity in handling by a nonrotatable hexagonal rod member in a body member.

DETAILED DESCRIPTION OF THE INVENTION

Figure 1:
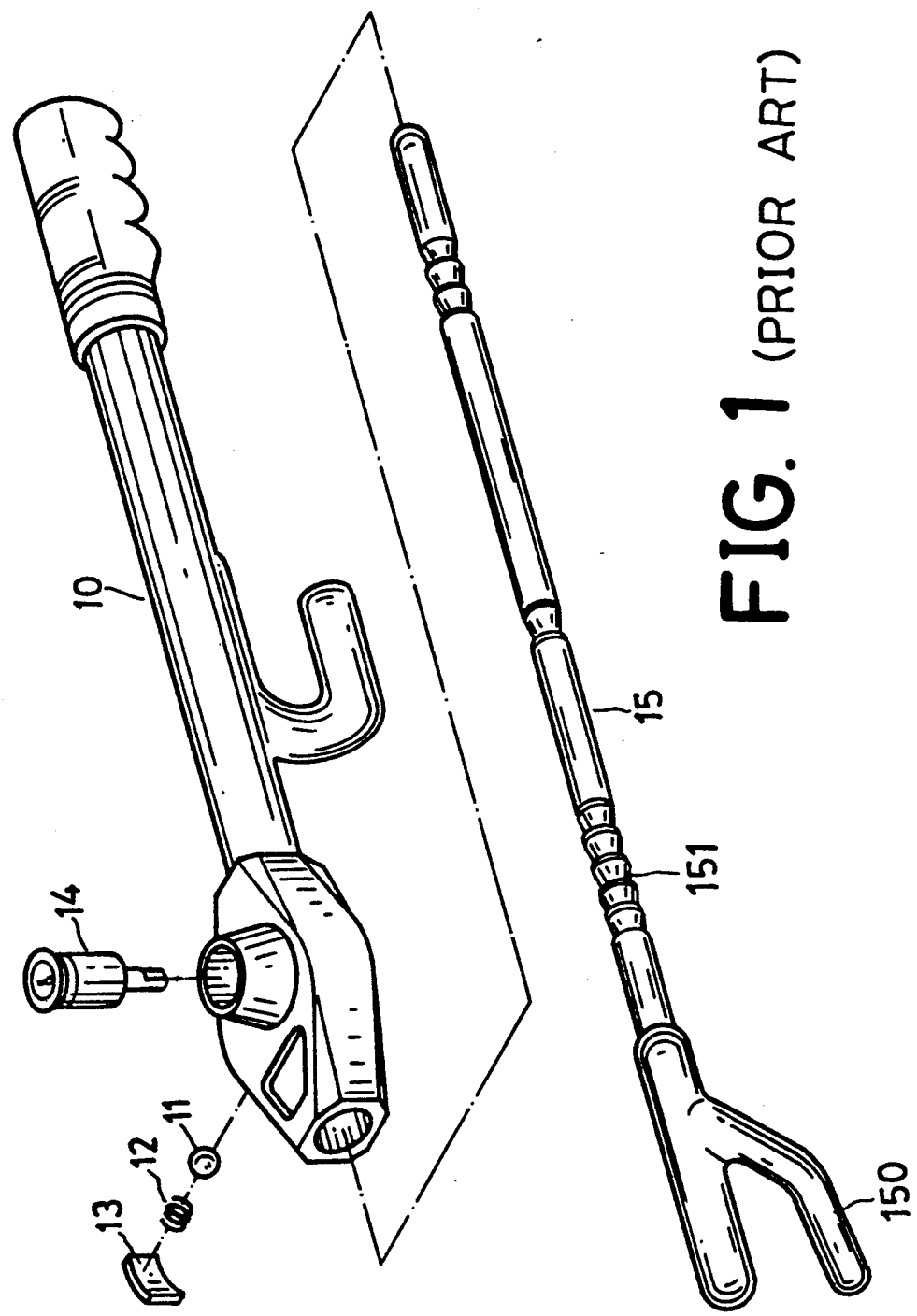
FIG. 1 is an exploded perspective view of a conventional automobile steering lock.
Figure 2:
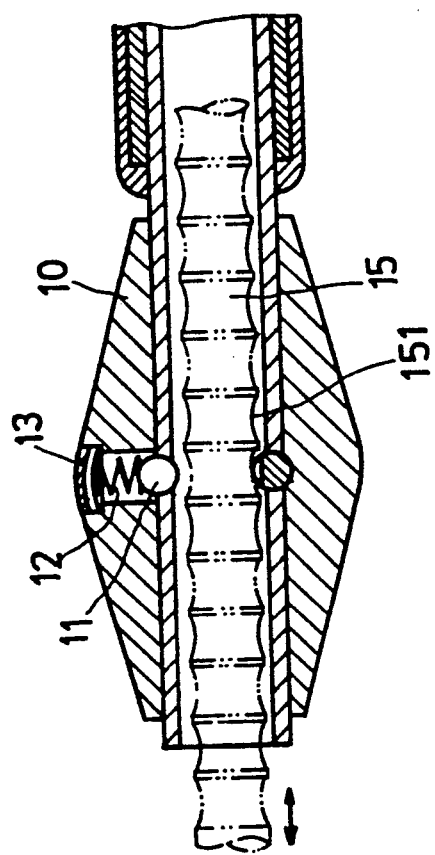
FIG. 2 is a partial cross-sectional view of the conventional automobile steering lock.
Figure 3:
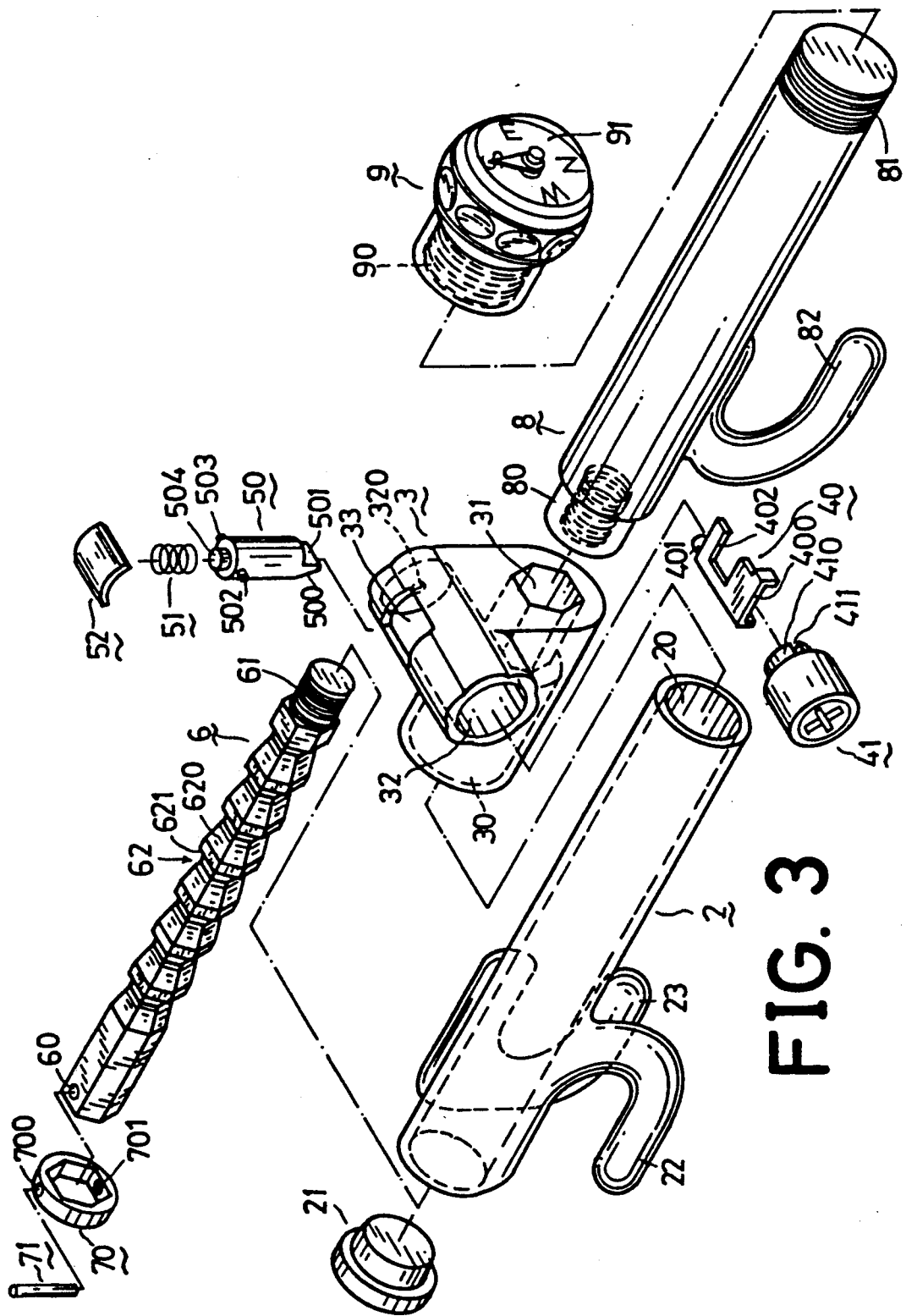
FIG. 3 is an exploded perspective view of the automobile steering lock of the present invention.
Figure 4:
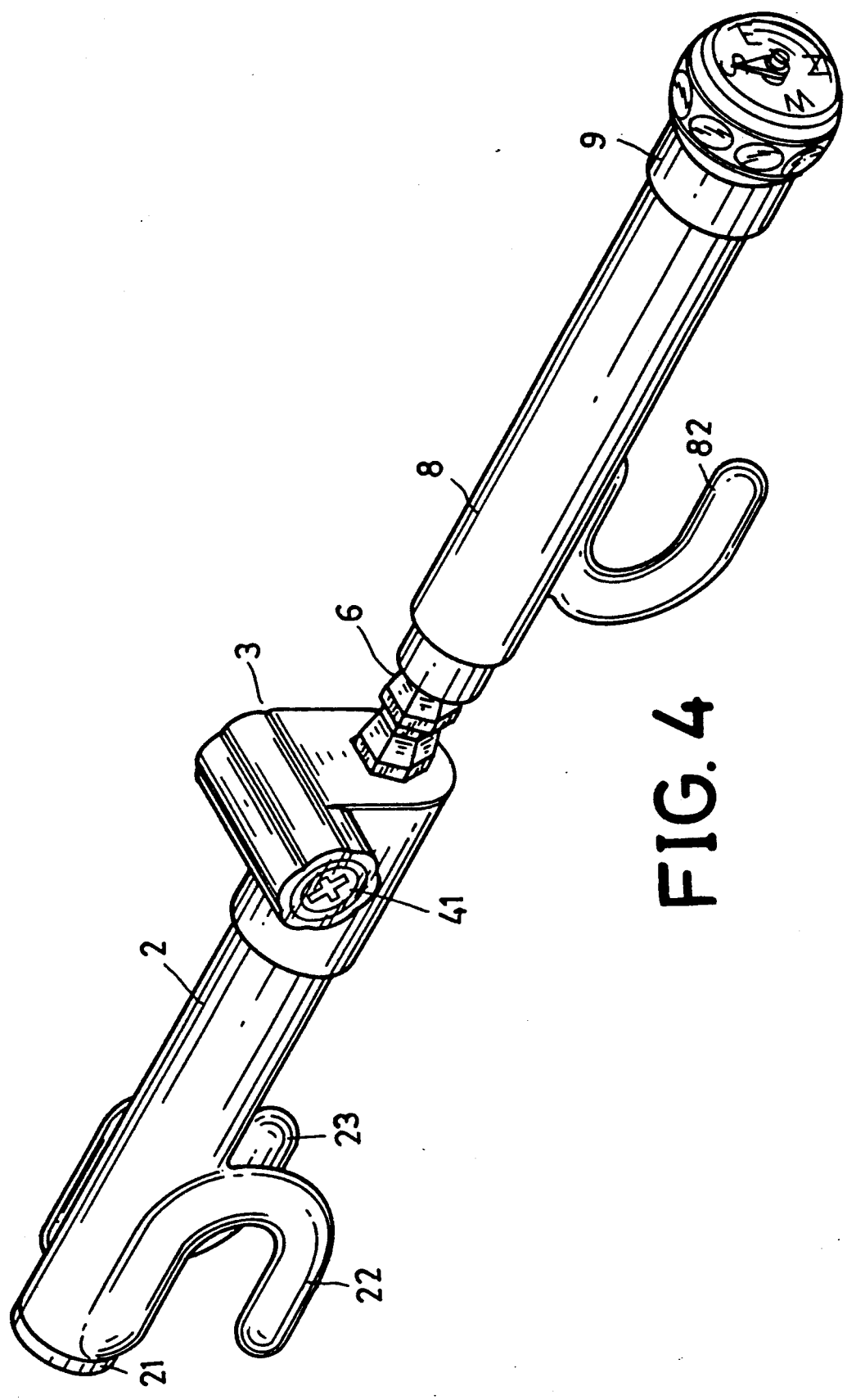
FIG. 4 is a perspective view of the automobile steering lock of the present invention.

Referring to FIGS. 3 and 4, an automobile steering lock comprises an elongated body member 2, a hexagonal rod member 6 which is dimensioned to move in telescopic fashion within the body member 2, an elongate connecting member 8 longitudinally connectible with the rod member 6, first hooks 22, 23 fixed in parallel and in opposite direction on the body member 2, second hook 82 fixed on the elongate connecting member 8, a housing 3 and a locking mechanism including a locking means 41 and locating means 50, 51 being provided within the housing 3.

The body member 2 is of tubular shape, having a round through passageway 20 and two hooks 22, 23 secured in parallel to the body member 2 by means of welding adjacent an outer end portion. The two hooks 22, 23 open in opposite directions, having a space between them for a portion of a steering wheel to fit therein. The body member 2 is welded with a cap 21 to close its outer end opening.

The housing 3 has a tubular hole 30 to fit around and be welded with the inner end portion of the body member 2 to communicate with the passageway 20, and a hexagonal hole 31 of smaller size than the tubular hole 30 and communicating with the tubular hole 30 for the rod member 6 to extend through both the hexagonal hole 31 and the tubular hole 30 to go into the passageway 20 in the body member 2. The housing 3 also has a horizontal crosswise bore 32 above the hexagonal hole 31 and a small hole 320 in a side surface and an opening 33 in the upper surface communicating with the bore 32.

The locking means 41 and an actuator 40 are lodged in the bore 32 and the actuator 40 has a reverse U-shaped inserting portion 400 for insertion in a pinching slot 411 in the bottom of the locking means 41, a stud shaft 401 at one end for insertion in a hole 320 in the housing 3, and a notch 402 in a right portion. The locking means 41 has a projection 410 at its bottom and a diametrical slot 411 in the projection 410 for engaging the inserting portion 400 in the actuator 40.

The locking means 50, 51 are sequentially placed through the opening 33 in the bore 32 and closed up therein with a cover 52 welded on the opening 33. The locating means 51 is a biasing spring constantly urging the locating means 50 downwardly, the latter having a slope 500 on one side of its bottom, a reverse L-shaped surface at the other side of its bottom, two sidewise stud shafts 502, 503 at opposite sides of its top portion and a projection 504 at the top surface for securing the bottom end of the spring 51.

The hexagonal rod member 6 extends in the passageway 20 in the body member 2 by passing through the hexagonal hole 31 and the tubular hole 30, and having a pin hole 60 in the left end, a male thread portion 61 at the right end to screw a female thread portion 80 in the left end of elongate connecting member 8, and also a plurality of annular grooves 62, each having a slope side wall 620 and a vertical side wall 621. A stop ring 70 has two pin holes 700, 701 for receiving a pin 71 which also extends through hole 60 to fix the stop ring 70 on the end of the rod member 6.

The elongate connecting member 8 has a female thread portion 80 at a left end to engage with the male thread portion 61 of the rod member 6 to become a grip of the rod member 6 so as to push or pull the rod member 6 in or out of the body member 2, and a male thread portion 81 at a right end to engage with a female thread 90 at a left end of a compass head 9 having a compass 91 at a right end.

In assembling this steering lock, at first the housing 3 is welded at the right end of the body member 2, and the stop ring 70 is fixed on the left end of the rod member 6, with the pin 71 inserting through the pin holes 700, 701 and 60. Then the rod member 6 is put through the hexagonal hole 31 in the housing 3 and in the passageway 20 in the body member 2 and the cap 21 is welded in the left end thereof. Next, the actuator 40 and the locking means 41 are in order lodged in the bore 32 in the housing 3, letting the inserting portion 400 in the actuator 40 engage the pinching slot 411 in the locking means 41; the locating means 50 and the biasing spring 51 are put through the opening 33 in the bore 32 and the cover 52 is welded on the opening 33. Then a correct key can be inserted in the locking means 41 and rotated to turn the actuator 40 to raise up the locating means 50 to open this lock, and if the key is taken out of the locking means 41, the locating means 50 is biased downwardly to its original position by the biasing spring 51. Lastly, the rod member connecting member 8 is connected with the rod member 6 by screwing the threaded portion 61 with the threaded portion 80, and the compass head 9 is screwed with the threaded right end of the elongate connecting member 8. This completes the assembly.

Figure 5:
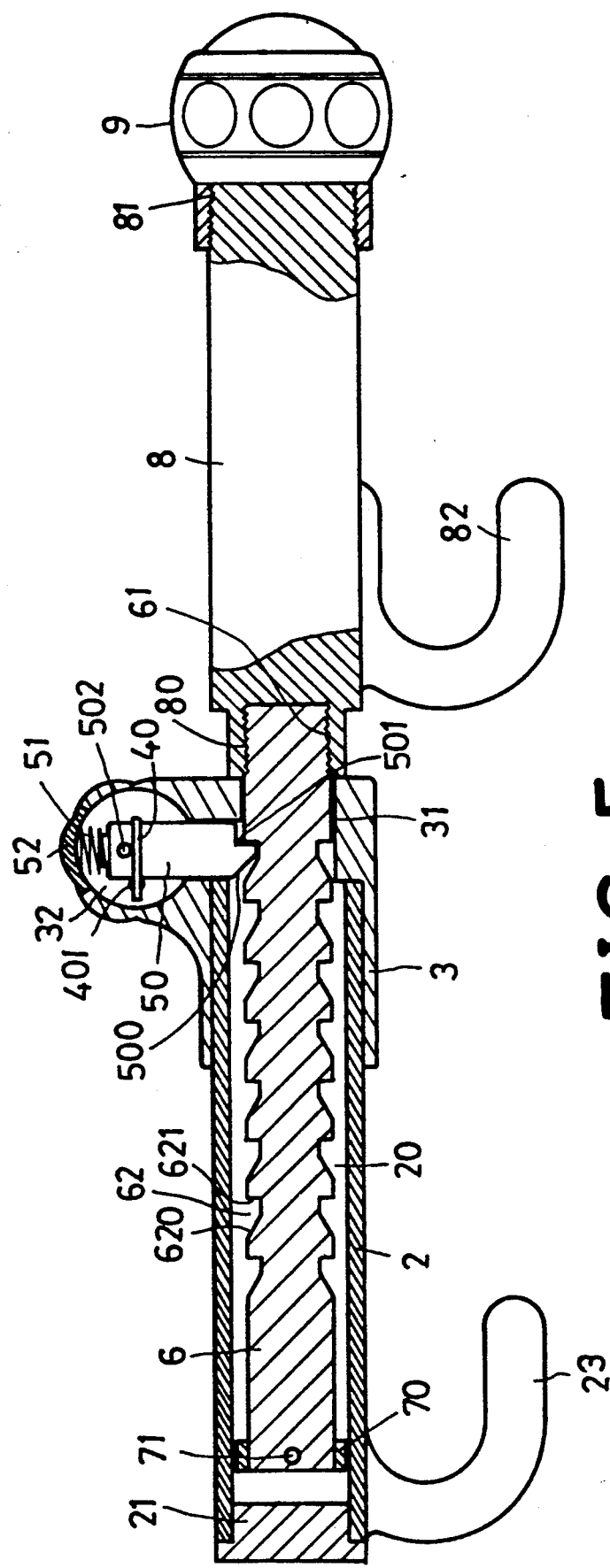
FIG. 5 is a cross-sectional view of the automobile steering lock of the present invention.
Figure 6:
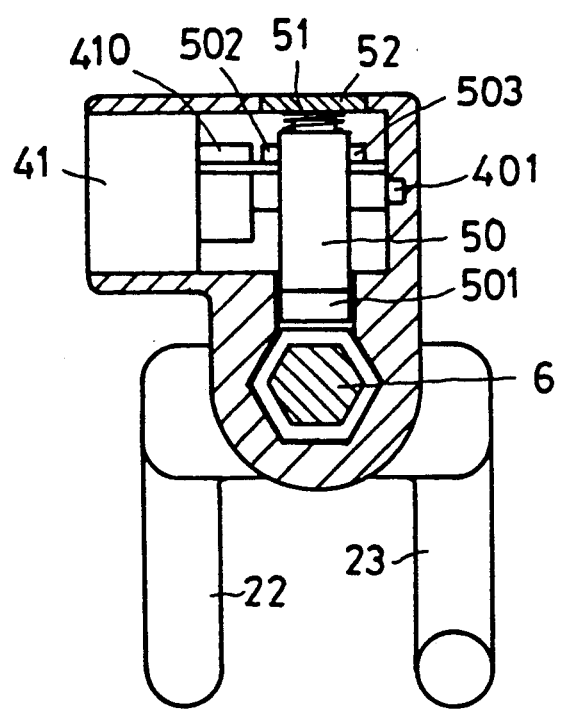
FIG. 6 is a right-side cross-sectional view of FIG. 4.
Figure 7:
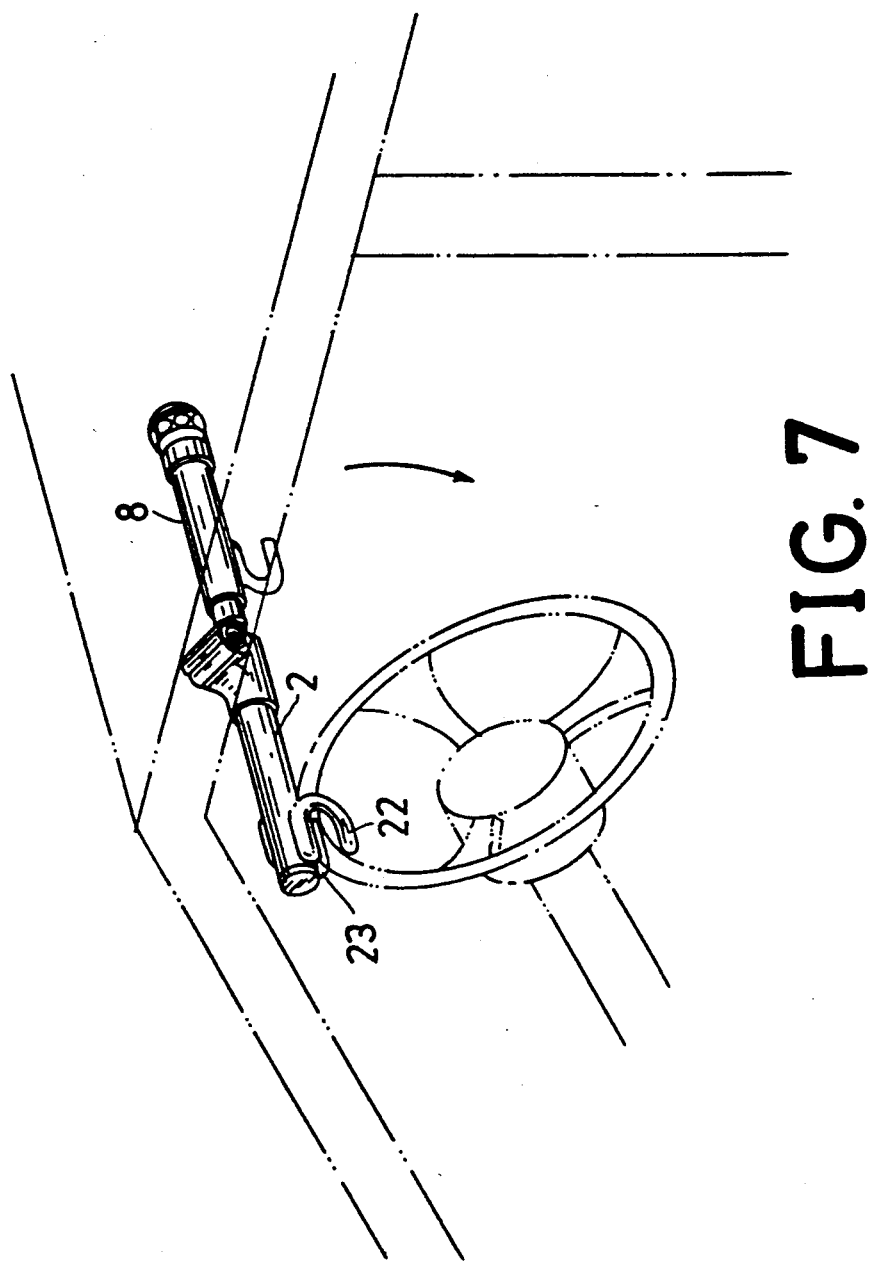
FIG. 7 is a perspective view of the automobile steering lock of the present invention being fixed on a steering wheel.
Figure 8:
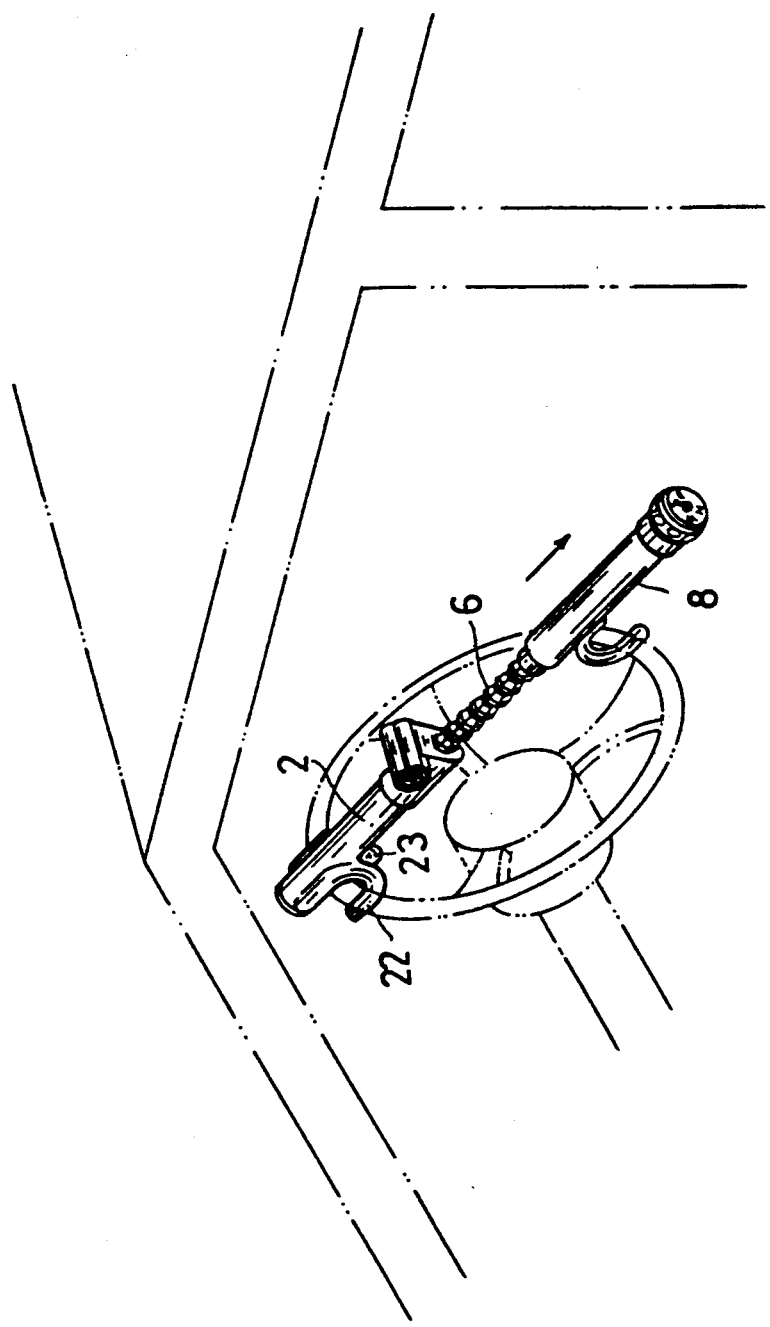
FIG. 8 is a perspective view of the automobile steering lock of the present invention hooked and locked on a steering wheel.

In fixing this steering lock on a steering wheel, a shown in FIG. 7, the steering lock is horizontally placed on the steering wheel, with the space between the two hooks 22, 23 in the body member 2 being fitted with a portion of the steering wheel, and the steering lock is gradually turned downward as shown in FIGS. 5 and 8, letting the hooks 22, 23 engage the portion of the steering wheel and then the elongate connecting member 8 is pulled out, drawing the rod member 6 telescopically outward in the passageway 20 at the same time. When the rod member 6 is drawn outward, the locating means 50 moves up and down elastically with its bottom end sliding on the slope side walls 620 in the annular grooves 62 in the rod member 6, unable to be stopped by the locating means 50. But when the rod member 6 is pushed inward, the reverse L-shaped surface of the bottom end of the locating means 50 can engage the vertical side wall 621 of one of the annular grooves 62, to stop the rod member 6 and render same immovable. Therefore, if the elongate connecting member 8 is pulled out to let the hook 82 properly hook from inside on an opposite portion of the steering wheel, then the steering lock automatically locks and renders the steering wheel immovable.

In unlocking this steering lock after locked on a steering wheel, a correct key has to be used to rotate the locking means 41, which then rotate the actuator 40. Then the actuator 40 can raise up the locating means 50 compressing the biasing spring 51. So the reverse L-shaped surface 501 at the bottom of the locating means 50 separates from the vertical side wall 621 of one of the annular grooves 62 in the rod member 6, freeing the rod member 6 and permitting same to be pushed inward so that the hook 82 can be dehooked from the steering wheel.

What is claimed is:

1. An anti-theft device for attachment to a steering wheel of an automobile comprising:
    a) an elongate tubular member including a central longitudinal passageway therethrough and a pair of hooks secured adjacent a first end thereof, with the hooks opening in opposite directions and parallel to one another for engaging a first portion of the steering wheel;
    b) a hexagonal rod member telescopically receivable within the passageway of the tubular member, the rod member including a plurality of longitudinally spaced annular grooves, with each groove being defined by a vertical sidewall and a slope sidewall;
    c) a housing having a tubular hole for receiving and securing a second end of the tubular member, a hexagonal hole in axial alignment and communicating with the tubular hole for slidably receiving the hexagonal rod member therethrough, a horizontal cross-wise bore and an opening in an upper surface of the housing;
    d) a locking means, an actuator, a locating means and a biasing spring disposed within the horizontal cross-wise bore of the housing, the locking means including a diametrical slot in a bottom thereof for receiving a portion of the actuator to permit rotation of the actuator by the locking means, the locating means being urged by the biasing spring into engagement with a selected annular groove of the hexagonal rod member to render the rod member immovable with respect to the housing; and
    e) wherein rotation of the actuator by the locking means causes the locating means to be disengaged from the selected annular groove and permit the rod member to slide freely through the central passageway of the tubular member and the hexagonal hole of the housing.

2. The anti-theft device of claim 1 further including:
    a) an elongate connecting member including a female threaded portion and a U-shaped hook for engaging a second opposite portion of the steering wheel; and
    b) the hexagonal rod member includes a male threaded portion detachably engageable with the female threaded portion of the elongate connecting member.

3. The anti-theft device of claim 2 wherein the elongate connecting member further includes a compass means for determining direction.

* * * * *